US012331887B2

(12) United States Patent
Jung

(10) Patent No.: US 12,331,887 B2
(45) Date of Patent: Jun. 17, 2025

(54) MOBILITY AND METHOD FOR CONTROLLING OPERATION THEREOF

(71) Applicants: Hyundai Motor Company, Seoul (KR); Kia Corporation, Seoul (KR)

(72) Inventor: Se Kwon Jung, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 213 days.

(21) Appl. No.: 18/357,754

(22) Filed: Jul. 24, 2023

(65) Prior Publication Data

US 2024/0200724 A1 Jun. 20, 2024

(30) Foreign Application Priority Data

Dec. 15, 2022 (KR) .................. 10-2022-0176135

(51) Int. Cl.
*F17C 5/00* (2006.01)
*B60L 50/72* (2019.01)
*B60L 58/12* (2019.01)
*B60L 58/30* (2019.01)
*B60L 58/40* (2019.01)
(Continued)

(52) U.S. Cl.
CPC .............. *F17C 5/007* (2013.01); *B60L 50/72* (2019.02); *B60L 58/12* (2019.02); *B60L 58/30* (2019.02); *B60L 58/40* (2019.02); *H01M 8/04201* (2013.01); *H01M 8/04753* (2013.01); *H01M 8/04925* (2013.01); *H01M 16/003* (2013.01); *H01M 16/006* (2013.01); *B60L 2240/40* (2013.01); *B60L 2250/16* (2013.01); *F17C 2221/012* (2013.01); *F17C 2250/03* (2013.01); *F17C 2250/0626* (2013.01); *F17C 2260/02* (2013.01); *F17C 2265/065* (2013.01); *F17C 2270/0168* (2013.01); *F17C 2270/0184* (2013.01); *H01M 2250/20* (2013.01)

(58) Field of Classification Search
CPC F17C 5/007; F17C 2221/012; F17C 2250/03; F17C 2250/0626; F17C 2260/02; F17C 2265/065; F17C 2270/0168; F17C 2270/0184; F17C 1/12; B60L 50/72; B60L 58/12; B60L 58/30; B60L 58/40; B60L 2240/40; B60L 2250/16; B60L 50/70; B60L 2200/12; B60L 2200/22; B60L 2200/24; H01M 8/04201; H01M 8/04753; H01M 8/04925; H01M 16/003; H01M 16/006; H01M 2250/20; H01M 8/04208; H01M 8/04388; H01M 8/0494; B60S 5/02; B60Y 2200/11; B60Y 2200/13; B60Y 2200/51; Y02E 60/50; Y02T 90/12; Y02T 90/40
See application file for complete search history.

(56) References Cited

PUBLICATIONS

Youtube, "Fueling a LNG Vehicle," https://www.youtube.com/watch?v=7qAP3WJ4Aa8, Nov. 10, 2015, 12 pages.

*Primary Examiner* — Alan D Hutchinson
(74) *Attorney, Agent, or Firm* — Slater Matsil, LLP

(57) ABSTRACT

A mobility includes a storage vessel, a power train configured to generate power using liquid hydrogen stored in the storage vessel, and a control device configured to downwardly adjust a target operating pressure of the storage vessel at a time of entering a refueling preparation mode, compare a supply pressure of the liquid hydrogen supplied to the power train with a target hydrogen supply pressure according to the target operating pressure, and limit the power of the power train in response to the supply pressure of the liquid hydrogen being less than the target hydrogen supply pressure.

20 Claims, 4 Drawing Sheets

(51) Int. Cl.
*H01M 8/04082* (2016.01)
*H01M 8/04746* (2016.01)
*H01M 8/04858* (2016.01)
*H01M 16/00* (2006.01)

MOBILITY AND METHOD FOR CONTROLLING OPERATION THEREOF

CROSS-REFERENCE TO RELATED APPLICATIONS

This application claims the benefit of Korean Patent Application No. 10-2022-0176135, filed on Dec. 15, 2022, which application is hereby incorporated herein by reference.

TECHNICAL FIELD

The present disclosure relates to a mobility and a method for controlling operation thereof.

BACKGROUND

When cryogenic fluids such as liquefied natural gas (LNG) and liquid hydrogen are refueled in a storage vessel, the cryogenic fluids injected into the storage vessel evaporate and/or vaporize. As the pressure of the storage vessel increases and the pressure inside the storage vessel increases more than the injected pressure, the refueling amount of the storage vessel is limited. In such a situation, the pressure inside the storage vessel is lowered more than the cryogenic gas refueling pressure by exhausting the vaporized gas or vapor inside the storage vessel to the outside through a separate vent line at the beginning of refueling or during refueling of the storage vessel. Particularly, for liquid hydrogen, refueling in the storage vessel has been performed under the condition that the pressure inside the storage vessel is maintained at a low pressure close to normal pressure by directly exhausting the hydrogen evaporated during refueling by combining the refueling line with the exhaust line.

However, recently, a refueling technology for increasing the pressure up to 16 bar has been introduced. According to this refueling technology, hydrogen refueling efficiency may be relatively increased because no hydrogen is wasted through exhaust. Furthermore, in the refueling technology, more hydrogen may be refueled as the difference between the initial refueling pressure and the refueling completion pressure increases. For example, comparing the injection of hydrogen up to 16 bar into a storage vessel having a pressure of 10 bar with the injection of hydrogen up to 16 bar into a storage vessel having a pressure of 5 bar, the amount of hydrogen refueling of the latter is much larger.

SUMMARY

The present disclosure relates to a mobility and a method for controlling operation thereof. Particular embodiments relate to a mobility using hydrogen as fuel and a method for controlling operation thereof.

An existing refueling technology needs to reduce the internal pressure of a storage vessel immediately before refueling, but has a possibility that the amount of hydrogen required by a fuel cell system will not be supplied due to the reduction of differential pressure between the storage vessel and the fuel cell system. Because the lower the operating pressure of the storage vessel, the more the amount of pressure drop generated in piping which connects between the storage vessel and the fuel cell system increases when supplying the same hydrogen to the fuel cell system, a vicious cycle in which the amount of hydrogen supply is further reduced may occur. Furthermore, due to the insufficient amount of hydrogen supplied to the fuel cell system, the maximum power of the fuel cell system is limited. When the diameter of piping increases to prevent it, the system assemblability deteriorates and the pipe weight increases.

Embodiments of the present disclosure can solve problems occurring in the prior art while advantages achieved by the prior art are maintained intact.

An embodiment of the present disclosure provides a mobility for limiting power of a power train and reducing internal pressure of a storage vessel to the maximum before refueling liquid hydrogen which is fuel and a method for controlling operation thereof.

Another embodiment of the present disclosure provides a mobility for notifying a user that there is a possibility that deterioration in operation performance will occur due to a limit to the power of a power train when limiting the power of the power train such that the user may recognize it and a method for controlling operation thereof.

Another embodiment of the present disclosure provides a mobility for identifying a user's intention and determining whether to limit the power of a power train before entering and exiting a refueling preparation mode for limiting the power of the power train and a method for controlling operation thereof.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, a mobility may include a storage vessel storing liquid hydrogen, a power train that generates power using the liquid hydrogen, and a control device that downwardly adjusts a target operating pressure of the storage vessel when entering a refueling preparation mode, compares a supply pressure of hydrogen supplied to the power train with target hydrogen supply pressure according to the target operating pressure, and limits power of the power train when the supply pressure of the hydrogen is less than the target hydrogen supply pressure.

According to another embodiment of the present disclosure, a mobility may include a storage vessel storing liquid hydrogen, a power train that generates power using the liquid hydrogen, an auxiliary power train that assists the power train to supply power, and a control device that downwardly adjusts a target operating pressure of the storage vessel when entering a refueling preparation mode, determines a target hydrogen supply pressure according to the target operating pressure, and limits power of the power train when the supply pressure of the hydrogen supplied to the power train is less than the target hydrogen supply pressure and when a state of charge (SOC) of the auxiliary power train is higher than an operating lower limit.

The control device may enter the refueling preparation mode when a destination of the mobility is set to a hydrogen refueling station or when a switch to which a function of enabling and disabling the refueling preparation mode is allocated is turned on.

The control device may enter the refueling preparation mode when a user's intention to agree to enter the refueling preparation mode is identified.

The control device may limit the maximum power of the power train based on a mapping table including a defined power limit target value of the power train according to the supply pressure of the hydrogen.

The control device may exit the refueling preparation mode when a SOC of the storage vessel is greater than or equal to a predetermined reference value.

The control device may exit the refueling preparation mode when a user's intention to agree to exit the refueling preparation mode is identified.

The control device may output information indicating that power of the power train is limited using a user interface device.

The auxiliary power train may include at least one of a battery, a supercapacitor, or a combination thereof.

According to another embodiment of the present disclosure, a method for controlling an operation of a mobility may include downwardly adjusting a target operating pressure of a storage vessel included in the mobility when entering a refueling preparation mode, comparing a supply pressure of hydrogen supplied to a power train included in the mobility with a target hydrogen supply pressure according to the target operating pressure, and limiting power of the power train when the supply pressure of the hydrogen is less than the target hydrogen supply pressure.

The method may further include entering the refueling preparation mode when a destination of the mobility is set to a hydrogen refueling station or when a switch to which a function of enabling and disabling the refueling preparation mode is allocated is turned on.

The method may further include entering the refueling preparation mode when a user's intention to agree to enter the refueling preparation mode is identified.

The limiting of the power of the power train may include limiting the maximum power of the power train based on a mapping table including a defined power limit target value of the power train according to the supply pressure of the hydrogen.

The limiting of the power of the power train may include identifying whether a SOC of an auxiliary power train included in the mobility, the auxiliary power train assisting the power train to supply power, is less than or equal to an operating lower limit, releasing the refueling preparation mode when the SOC of the auxiliary power train is less than or equal to the operating lower limit, and limiting the power of the power train when the SOC of the auxiliary power train is greater than the operating lower limit.

The method may further include exiting the refueling preparation mode when a SOC of the storage vessel is greater than or equal to a predetermined reference value.

The method may further include exiting the refueling preparation mode when a user's intention to agree to enter the refueling preparation mode is identified.

BRIEF DESCRIPTION OF THE DRAWINGS

The above and other objects, features, and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
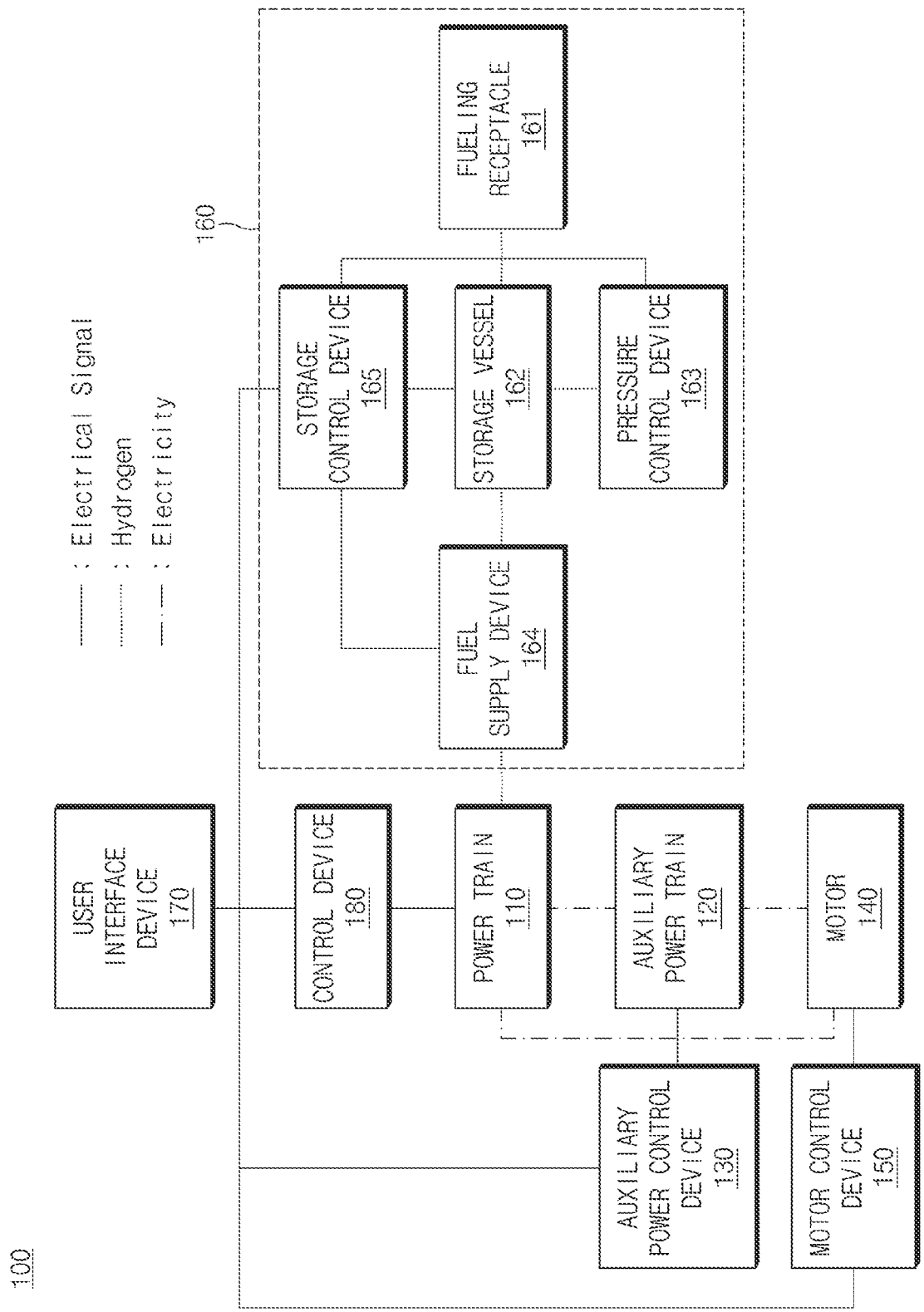
FIG. 1 is a block diagram illustrating a configuration of a mobility according to embodiments of the present disclosure.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be omitted in order not to unnecessarily obscure the gist of the present disclosure.

In describing the components of the embodiments according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art and are not to be interpreted as having ideal or excessively formal meanings unless clearly defined as having such in the present application.

FIG. 1 is a block diagram illustrating a configuration of a mobility according to embodiments of the present disclosure.

A mobility 100 may be transportation, such as a vehicle, a bicycle, an electric scooter, and/or a drone, which may use liquid hydrogen as fuel. Such a mobility 100 may include a power train 110, an auxiliary power train 120, an auxiliary power control device 130, a motor 140, a motor control device 150, a fuel storage system 160, a user interface device 170, and a control device 180.

The power train 110 may generate power necessary for motion (or movement) of the mobility 100. The power train 110 may produce power (or electrical energy) using hydrogen supplied from the fuel storage system 160. The power train 110 may supply the produced power to the auxiliary power train 120 and/or the motor 140. The power train 110 may adjust power depending on a control command transmitted from the control device 180. Various power sources, such as a fuel cell system, a hydrogen engine, and/or a hydrogen turbine, may be used as the power train 110.

The auxiliary power train 120 may be configured as a hybrid power system together with the power train 110. At this time, the auxiliary power train 120 may assist the power train 110 to supply power to the motor 140. The auxiliary power train 120 may store electrical energy produced by the power train 110 and/or the motor 140. A battery (or a high voltage battery), a supercapacitor, and/or the like may be used as the auxiliary power train 120.

The auxiliary power control device 130 may control charging and discharging of the auxiliary power train 120. The auxiliary power control device 130 may monitor a state of the auxiliary power train 120 using various sensors (e.g., a current sensor, a voltage sensor, a temperature sensor, and/or the like). The auxiliary power control device 130 may manage a state of charge (SOC) of the auxiliary power train 120 through monitoring.

The motor 140 may receive power, that is, electrical energy from the power train 110 and/or the auxiliary power train 120 and may generate power (or motor power or motor torque) necessary to drive vehicle wheels. The motor 140 may adjust a magnitude of generated output torque (or motor torque) under control of the motor control device 150. Furthermore, the motor 140 may generate a back electromotive force to charge the auxiliary power train 120, when the SOC of the auxiliary power train 120 is insufficient or upon regenerative braking.

The motor control device 150 may control a rotational direction, a revolution per minute (RPM), and the like of the motor 140. The motor control device 150 may control the rotational direction and the RPM of the motor 140 depending on a command (e.g., target motor torque or the like) of an upper-level control device.

The fuel storage system 160 may store and manage liquid hydrogen used as fuel of the mobility 100.

The fuel storage system 160 may include a fueling receptacle 161, a storage vessel 162, a pressure control device 163, a fuel supply device 164, and a storage control device 165.

The fueling receptacle 161 may be used to inject (or refuel) liquid hydrogen, supplied from an external hydrogen dispenser, into the storage vessel 162. The fueling receptacle 161 may be connected with a nozzle provided in the external hydrogen dispenser.

The storage vessel 162 may store liquid hydrogen injected through the fueling receptacle 161. Sensors, such as a pressure sensor and/or a liquid level sensor, may be mounted on the storage vessel 162. It is shown that one storage vessel 162 is provided in the drawing, but embodiments of the disclosure are not limited thereto. Two or more storage vessels 162 may be provided.

The pressure control device 163 may measure an internal pressure of the storage vessel 162 using the pressure sensor and may monitor a change in the pressure. The pressure control device 163 may control (or adjust) the internal pressure of the storage vessel 162. The pressure control device 163 may be mounted on the inside and/or outside of the storage vessel 162.

When receiving an instruction to enter a hydrogen refueling mode from the storage control device 165, the pressure control device 163 may downwardly adjust a target operating pressure and/or a hydrogen supply pressure (or fuel supply pressure) of the storage vessel 162 from a pressure in a steady state by a predetermined certain pressure (e.g., 0.5 bar). Herein, the steady state may be defined as a state where power of the power train 110 (i.e., power of the mobility 100) needs not to be limited.

The fuel supply device 164 may draw and vaporize liquid hydrogen stored in the storage vessel 162, may raise a temperature of the vaporized hydrogen, and may supply the hydrogen to the power train 110. The fuel supply device 164 may adjust a pressure, a flow rate, and/or the like of liquid hydrogen supplied from the power train 110. The fuel supply device 164 may include a heater or a heat exchanger loaded into the storage vessel 162, valves, a pump, a blower, and the like.

The storage control device 165 may be connected with the storage vessel 162, the pressure control device 163, and the fuel supply device 164 to transmit and receive information therebetween. The storage control device 165 may control the storage vessel 162, the pressure control device 163, and the fuel supply device 164.

The user interface device 170 may support a correlation between the mobility 100 and a user (or a driver). The user interface device 170 may include an input device (e.g., a keyboard, a touch pad, a microphone, a touch screen, and/or the like) which generates data (e.g., a command) according to manipulation of the user, an output device (e.g., a display, a speaker, a tactile signal output device, and/or the like) which outputs information according to an operation of the mobility 100, and/or the like. Such a user interface device 170 may be implemented as a cluster, an audio, video, navigation (AVN) terminal, an in-vehicle infotainment terminal, a telematics terminal, and/or the like. The user interface device 170 may be provided in a cockpit. The cockpit may include the periphery of the driver's seat, that is, a seat, a steering wheel, a dashboard, various switches, and the like. The cockpit may include a control device for controlling an operation of the cockpit.

The user interface device 170 may output a pop-up window for displaying information on a display depending on a control command of the control device 180. Selection confirm buttons for confirming an intention of the user, for example, a "YES" button and a "NO" button may be included in the pop-up window. Furthermore, the user interface device 170 may play and output a sound effect corresponding to a specific event, a warning sound, and/or the like through the speaker depending on a control command of the control device 180.

The control device 180 may be connected with the power train 110, the auxiliary power control device 130, the motor control device 150, the storage control device 165, and the user interface device 170 over a network. The control device 180, the auxiliary power control device 130, the motor control device 150, the storage control device 165, and the user interface device 170 may perform cooperative control therebetween through communication. At least some of controllers of the control device 180, the auxiliary power control device 130, the motor control device 150, the storage control device 165, and the user interface device 170 may be configured to be integrated into each other.

The control device 180 may identify whether the mobility 100 meets a condition (or a refueling ready execution condition) for executing refueling ready logic. When the user sets a hydrogen refueling station to a destination in a navigation terminal or when the user turns on a switch (or a refueling preparation mode switch) to which a function of enabling and disabling the refueling preparation mode is allocated, the control device 180 may determine that the mobility 100 meets the refueling ready execution condition. For example, when the hydrogen refueling station is set to the destination by the user or when the refueling preparation mode switch is set to ON, the user interface device 170 may transmit information (or a signal) for instructing to enter the refueling preparation mode to the control device 180 and/or the storage control device 165 of the fuel storage system 160.

When it is determined that the mobility 100 meets the refueling ready execution condition, the control device 180 may identify an intention of the user to enter the refueling preparation mode by means of the user interface device 170. When it is determined that the mobility 100 meets the refueling ready execution condition, the control device 180 may output an inquiry message asking the user, "Do you want to enter the refueling preparation mode?" on a pop-up window of the user interface device 170. Furthermore, the control device 180 may output information about a situation capable of occurring when entering the refueling preparation mode on the user interface device 170. For example, the control device 180 may output a message warning of a possibility that a limit to the power of the power train 110 will occur, for example, "A limit to power may occur while operating in the refueling preparation mode." on the cluster.

At this time, the user interface device 170 may output the message in the form of visual and/or audible information.

The control device 180 may determine whether to enter the refueling preparation mode based on the identified intention of the user. When receiving information indicating agreement of the user to enter the refueling preparation mode from the user interface device 170, the control device 180 may determine to enter the refueling preparation mode. Meanwhile, when receiving information indicating disagreement of the user to enter the refueling preparation mode from the user interface device 170, the control device 180 may determine not to enter the refueling preparation mode.

When it is determined to enter the refueling preparation mode, the control device 180 may enter the refueling preparation mode. When entering the refueling preparation mode, the control device 180 may determine a target operating pressure of the storage vessel 162. The control device 180 may downwardly adjust a steady state operating pressure by a predetermined pressure (e.g., 1 bar) and may determine the downwardly adjusted operating pressure as the target operating pressure of the storage vessel 162. The steady state operating pressure may be defined as the target operating pressure of the storage vessel 162 in a steady state where a limit to power of the power train 110 is not required. The steady state operating pressure may vary with system configuration and may be determined by a system designer in advance. For example, the control device 180 may determine a pressure of 3 bar to 6 bar obtained by subtracting a predetermined pressure of 1 bar from the steady state operating pressure of 4 bar to 7 bar as the target operating pressure when entering the refueling preparation mode. As such, the control device 180 may determine an operating pressure lower than the target operating pressure in the steady state as the target operating pressure in the refueling preparation mode.

The control device 180 may control power of the power train 110 to continue operation of the mobility 100 until the mobility 100 arrives at the hydrogen refueling station. At this time, the power train 110 may generate power necessary for a behavior of the mobility 100 without limit.

The control device 180 may compare a supply pressure of hydrogen supplied to the power train 110, that is, a hydrogen supply pressure, with a target hydrogen supply pressure and may determine whether to limit power of the power train 110 based on the compared result. In other words, the hydrogen supply pressure may follow the target hydrogen supply pressure. The target hydrogen supply pressure may be defined as a power limit target value (or the amount of maximum hydrogen supply) of the fuel supply device 164 according to the target operating pressure. The target hydrogen supply pressure may vary with system configuration and may be determined by a system designer in advance. When it is identified that the hydrogen supply pressure is greater than or equal to the target hydrogen supply pressure, the control device 180 may normally operate without limiting the power of the power train 110. Meanwhile, when it is identified that the hydrogen supply pressure is not greater than or equal to the target hydrogen supply pressure, that is, when it is identified that the hydrogen supply pressure is less than the target hydrogen supply pressure, the control device 180 may limit the power of the power train 110. This is because another problem may occur due to an additional control error or a shortage of fuel because a flow rate lower than the initial design hydrogen supply flow rate is inevitably supplied due to differential pressure or the like generated in the process of supplying hydrogen when the hydrogen supply pressure is lower than the initial design pressure. In other words, the control device 180 may limit power of the power train 110 such that abnormal operation does not occur due to a shortage of hydrogen when the target operating pressure of the storage vessel 162 in the fuel storage system 160 is lowered. Internal pressure of the storage vessel 162 is reduced as hydrogen is consumed due to the operation of the mobility 100 and the pressure of the hydrogen supplied to the power train 110 and a flow rate capable of being supplied to the power train 110 are lowered by a differential pressure generated by the fuel supply device 164 due to this. At this time, this is to prevent abnormal operation of the power train 110 from occurring by limiting the amount of hydrogen consumed by the power train 110 by limiting the power of the power train 110.

When limiting the power of the power train 110, the control device 180 may determine a power limit target value of the power train 110 with reference to a mapping table previously stored in the memory. The amount of the maximum hydrogen supply of the fuel supply device 164 according to the operating pressure of the storage vessel 162 may be defined in the previously stored mapping table, and the amount of the power limit (or a power limit target value) of the power train 110 according to the hydrogen supply pressure of the fuel supply device 164 may be defined in the previously stored mapping table.

The control device 180 may output information indicating a state where the power of the power train 110 is limited on the user interface device 170 such that the user may recognize the state where the power of the power train 110 is limited. When outputting the information indicating the state where the power of the power train 110 is limited, the user interface device 170 may output information about the maximum power (or the power lower than the maximum power in the steady state) together in the power limit state.

When the risk of accident due to the limit to the power of the power train 110 is detected while limiting the power of the power train 110, the control device 180 may release the refueling preparation mode and may return to the steady state operating pressure. The control device 180 may identify a state of charge (SOC) of the auxiliary power train 120 through communication with the auxiliary power control device 130 while limiting the power of the power train 110. The control device 180 may identify whether the SOC of the auxiliary power train 120 is less than or equal to a predetermined lower limit. When the SOC of the auxiliary power train 120 is less than or equal to the predetermined lower limit, the control device 180 may immediately release the refueling preparation mode and may stop limiting the power of the power train 110. At this time, the control device 180 may output a power limit release (or a refueling preparation mode release), a reason for the release, and the like on the user interface device 170. For example, the control device 180 may control the user interface device 170 to display a message, "Battery SOC has reached a critical level and will automatically stop the refueling preparation mode." on the display. As such, in a situation where the SOC of the auxiliary power train 120 reaches the lower limit and auxiliary power by the auxiliary power train 120 is insufficient, the control device 180 may stop limiting the power of the power train 110, thus preventing an accident risk capable of occurring due to a shortage of power (e.g., that climbing on a high slope is not possible, a speed limit, or the like).

When it is identified that the mobility 100 arrives at the hydrogen refueling station and is turned off, the control device 180 may stop the power train 110. As an example, when it is identified that the mobility 100 is turned off after the mobility 100 arrives at the hydrogen refueling station, the control device 180 may immediately stop the power train 110. As another example, when it is identified that the mobility 100 is turned off after the mobility 100 arrives at the hydrogen refueling station, the control device 180 may charge the auxiliary power train 120 to the maximum and may additionally reduce the internal pressure of the storage vessel 162, without immediately stopping the power train 110. At this time, the control device 180 may output information indicative of reducing the pressure of the storage vessel 162 to increase the SOC on the user interface device 170. The user interface device 170 may output information in a visual form and/or an audible form such that the user recognizes that the pressure of the storage vessel 162 is reduced to increase the SOC.

When it is detected that the mobility 100 is turned on again, the control device 180 may identify whether the internal pressure of the storage vessel 162 is greater than or equal to a predetermined reference pressure. When the internal pressure of the storage vessel 162, which is measured by the pressure sensor, is greater than or equal to the predetermined reference pressure, the control device 180 may determine that refueling is completed. When the internal pressure of the storage vessel 162, which is measured by the pressure sensor, is less than the predetermined reference pressure, the control device 180 may determine that the refueling is not completed.

Furthermore, the control device 180 may measure a height of the liquid hydrogen in the storage vessel 162 using the liquid level sensor when the mobility 100 is turned on again, thus identifying the actual amount of fuel (or the remaining amount of fuel). The control device 180 may determine whether refueling is completed based on the identified actual amount of fuel. For example, the control device 180 may determine that the refueling is completed when the measured height of the liquid hydrogen is greater than or equal to the predetermined reference value and may determine that the refueling is not completed when the measured height of the liquid hydrogen is less than the predetermined reference value.

When it is determined that the refueling is completed, the control device 180 may exit the refueling preparation mode. When exiting the refueling preparation mode, the control device 180 may output information, for example, a pop-up message, a sound effect, a voice message, and/or the like, for being indicative of exiting the refueling preparation mode. For example, the control device 180 may output a message, "Exit the refueling preparation mode" on the cluster in the form of a pop-up.

When it is determined that the refueling is not completed, the control device 180 may output an inquiry message asking the user whether to exit the refueling preparation mode on the user interface device 170. For example, the control device 180 may output an inquiry message, "Do you want to exit the refueling preparation mode?" on the cluster. Thereafter, the control device 180 may determine whether to exit the refueling preparation mode depending on a user response. The control device 180 may exit the refueling preparation mode when the user response is "YES" and may maintain the refueling preparation mode when the user response is "NO."

Figure 2:
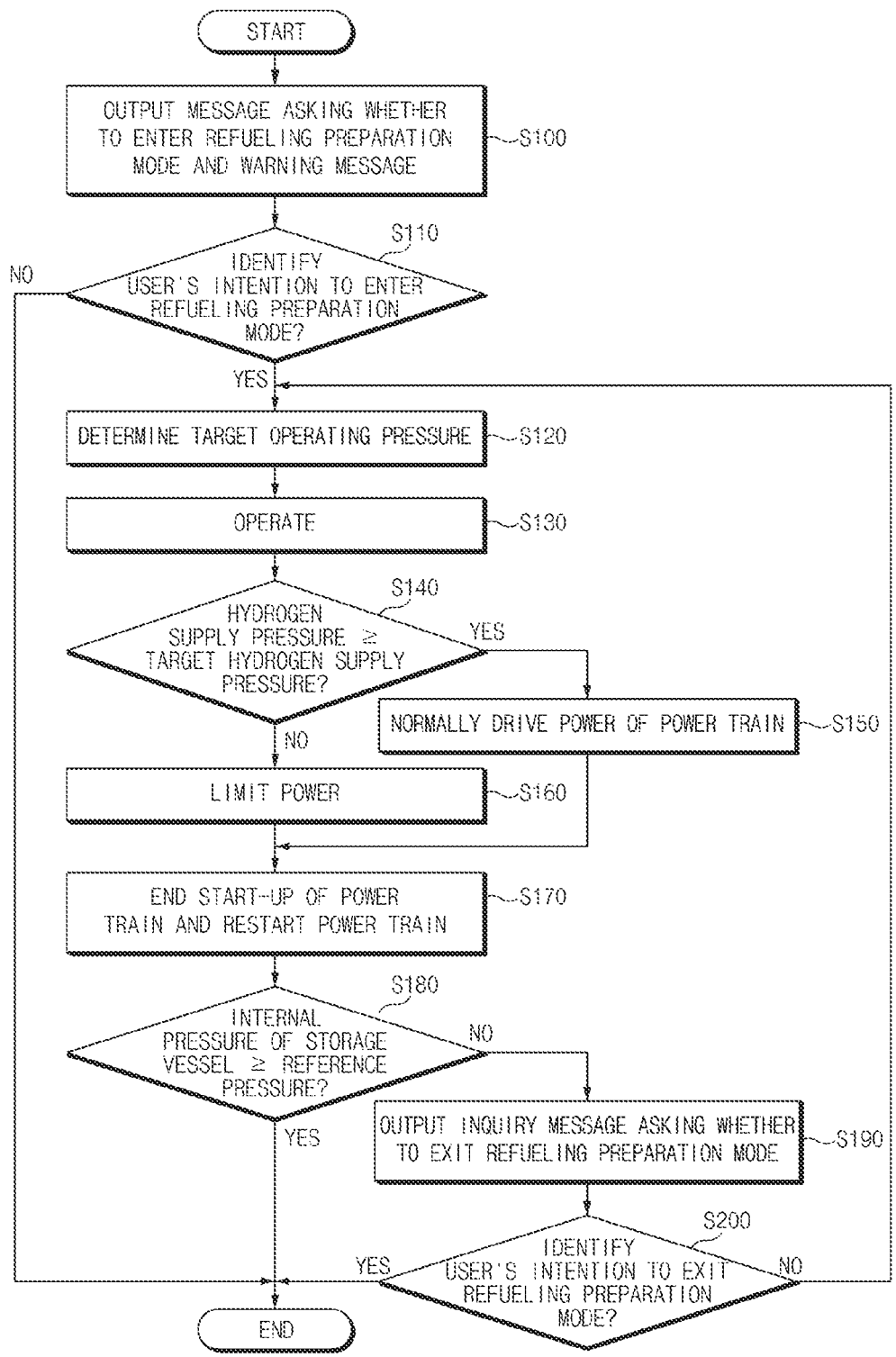
FIG. 2 is a flowchart illustrating a method for controlling operation of a mobility according to an embodiment of the present disclosure.

FIG. 2 is a flowchart illustrating a method for controlling operation of a mobility according to an embodiment of the present disclosure.

When a mobility 100 of FIG. 1 meets a refueling ready execution condition, in S100, a control device 180 of FIG. 1 may output a message asking whether to enter a refueling preparation mode and a warning message. When a destination of the mobility 100 is set to a hydrogen refueling station or when a switch (or a refueling preparation mode switch) to which a function of enabling and disabling the refueling preparation mode is allocated is turned on, the control device 180 may determine that the mobility 100 meets a condition (or the refueling ready execution condition) for executing refueling ready logic. When it is determined that the mobility 100 meets the refueling ready execution condition, the control device 180 may output an inquiry message for identifying an intention of a user (or a driver), e.g., "Do you want to enter the refueling preparation mode?" and a warning message warning of a possibility that a limit to power of the power train 110 will occur, e.g., "A limit to power may occur while operating in the refueling preparation mode." on a user interface device 170 of FIG. 1. At this time, the user interface device 170 may output the messages on a display in the form of visual information. Furthermore, the user interface device 170 may output the messages through a speaker in the form of audible information.

In S110, the control device 180 may identify an intention of the user to enter the refueling preparation mode. The control device 180 may identify whether the user has an intention to enter the refueling preparation mode using the user interface device 170. The user interface device 170 may transmit information indicating agreement (or permission) to enter the refueling preparation mode or disagreement to enter the refueling preparation mode to the control device 180 depending on a manipulation of the user. The control device 180 may receive information transmitted from the user interface device 170 and may determine an intention of the user to enter the refueling preparation mode based on the received information. For example, when receiving the information indicating the agreement of the user to enter the refueling preparation mode from the user interface device 170, the control device 180 may determine to enter the refueling preparation mode. Meanwhile, when receiving the information indicating the disagreement of the user to enter the refueling preparation mode from the user interface device 170, the control device 180 may determine not to enter the refueling preparation mode.

When the intention of the user to agree to enter the refueling preparation mode is identified, in S120, the control device 180 may determine target an operating pressure of a storage vessel 162 of FIG. 1. When the intention of the user to agree to enter the refueling preparation mode is identified, the control device 180 may enter the refueling preparation mode. Furthermore, the control device 180 may downwardly adjust a steady state operating pressure by a predetermined pressure (e.g., 1 bar) and may determine the downwardly adjusted operating pressure as the target operating pressure of the storage vessel 162. The steady state operating pressure may be defined as the target operating pressure of the storage vessel 162 in a steady state where the limit to the power of a power train 110 of FIG. 1 is not required. The steady state operating pressure may vary with system configuration and may be determined by a system designer in advance. For example, when the user agrees to enter the refueling preparation mode, the control device 180 may determine a pressure of 3 bar to 6 bar obtained by subtracting a predetermined pressure of 1 bar from the steady state operating pressure of 4 bar to 7 bar as the target operating pressure. As such, the control device 180 may determine a pressure lower than the target operating pressure in the steady state as the target operating pressure in the refueling preparation mode.

In S130, the control device 180 may control the power of the power train 110 to continue operation of the mobility 100 until the mobility 100 arrives at the hydrogen refueling station.

In S140, the control device 180 may compare the target hydrogen supply pressure with the hydrogen supply pressure and may identify whether the hydrogen supply pressure is greater than or equal to the target hydrogen supply pressure. The control device 180 may identify whether the supply pressure of the hydrogen supplied to the power train 110, that is, the hydrogen supply pressure, is greater than or equal to the predetermined target hydrogen supply pressure and may determine whether to limit the power of the power train 110 depending on the identified result. The target hydrogen supply pressure may be defined as a power limit target value (or the amount of the maximum hydrogen supply) of a fuel supply device 164 of FIG. 1 according to the target operating pressure. The target hydrogen supply pressure may vary with system configuration and may be determined by a system designer in advance.

When it is identified that the hydrogen supply pressure is greater than or equal to the target hydrogen supply pressure, in S150, the control device 180 may normally operate the power of the power train 110. At this time, the control device 180 may normally operate the power of the power train 110 without limiting the power of the power train 110.

When the hydrogen supply pressure is not greater than or equal to the target hydrogen supply pressure, in S160, the control device 180 may limit the maximum power of the power train 110. The control device 180 may determine a power limit target value (or maximum power) of the power train 110 based on a mapping table in which the amount of the maximum hydrogen supply of the fuel supply device 164 according to the operating pressure of the storage vessel 162 is defined. The control device 180 may display information indicating that the power of the power train 110 is limited on a display of the user interface device 170 such that the user recognizes that the power of the power train 110 is limited. At this time, the control device 180 may control the user interface device 170 to output the maximum power information together in a power limit state.

When the mobility 100 arrives at a hydrogen refueling station, in S170, the control device 180 may end the start-up of the power train 110 and may restart the power train 110. When the mobility 100 arrives at the hydrogen refueling station and receives a start-up end command from an upper-level control device, the control device 180 may immediately end the start-up of the power train 110. Furthermore, the control device 180 may charge an auxiliary power train 120 of FIG. 1 to the maximum and may additionally reduce the internal pressure of the storage vessel 162 without immediately stopping the power train 110 when the mobility 100 arrives at the hydrogen refueling station and receives the start-up end command from the upper-level control device. At this time, the control device 180 may output information indicating that "the internal pressure of the storage vessel is being reduced to increase the SOC" using the user interface device 170. Thereafter, when receiving a start-up command from the upper-level control device, the control device 180 may restart the power train 110.

When restarting the power train 110, in S180, the control device 180 may identify whether the internal pressure of the storage vessel 162 is greater than or equal to a predetermined reference pressure. The reference pressure may be used as a criterion for determining whether refueling of the storage vessel 162 is completed. When it is identified that the internal pressure of the storage vessel 162 is greater than or equal to the predetermined reference pressure, the control device 180 may exit the refueling preparation mode. When exiting the refueling preparation mode, the control device 180 may output a message, "Exit the refueling preparation mode" on a cluster. Furthermore, the control device 180 may output another type of information, for example, a sound effect, a voice, or the like, which is indicative of exiting the refueling preparation mode.

When it is identified that the internal pressure of the storage vessel 162 is not greater than or equal to the predetermined reference pressure in S180, in S190, the control device 180 may output a message asking a user whether to exit the refueling preparation mode on the user interface device 170. For example, the control device 180 may output an inquiry message, "Do you want to exit the refueling preparation mode?" on the cluster. Thereafter, the control device 180 may exit the refueling preparation mode when the driver selects "YES" and may maintain the refueling preparation mode when the driver selects "NO."

In S200, the control device 180 may identify an intention of the user to exit the refueling preparation mode. When the user agrees to exit the refueling preparation mode, the control device 180 may exit the refueling preparation mode. Meanwhile, when the user does not agree to exit the refueling preparation mode, the control device 180 may perform the operation from S120.

Figure 3:
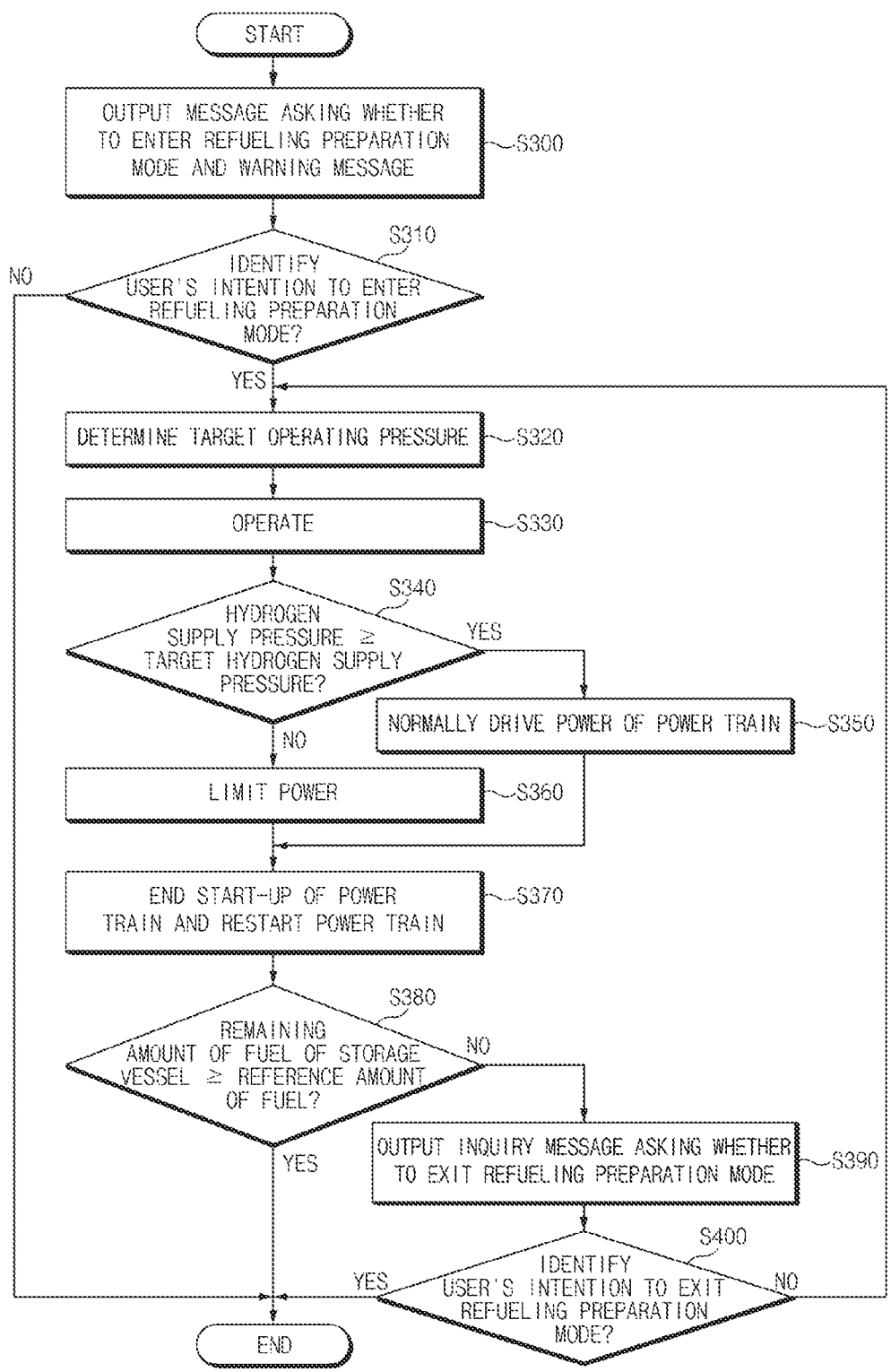
FIG. 3 is a flowchart illustrating a method for controlling operation of a mobility according to another embodiment of the present disclosure.

FIG. 3 is a flowchart illustrating a method for controlling operation of a mobility according to another embodiment of the present disclosure.

When a mobility 100 of FIG. 1 meets a refueling ready execution condition, in S300, a control device 180 of FIG. 1 may output a message asking whether to enter a refueling preparation mode and a warning message. When a destination of the mobility 100 is set to a hydrogen refueling station or when a switch to which a function of enabling and disabling the refueling preparation mode is allocated is turned on, the control device 180 may determine that the mobility 100 meets the refueling ready execution condition. When it is determined that the mobility 100 meets the refueling ready execution condition, the control device 180 may output an inquiry message for identifying an intention of a user (or a driver), e.g., "Do you want to enter the refueling preparation mode?" and a warning message warning of a possibility that a limit to the power of the power train 110 will occur, e.g., "A limit to power may occur while operating in the refueling preparation mode." on a user interface device 170 of FIG. 1. At this time, the user interface device 170 may output the messages on a display in the form of visual information. Furthermore, the user interface device 170 may output the messages through a speaker in the form of audible information.

In S310, the control device 180 may identify an intention of the user to enter the refueling preparation mode. The control device 180 may identify whether the user has an intention to enter the refueling preparation mode using the user interface device 170. The user interface device 170 may transmit information indicating agreement to enter the refueling preparation mode or disagreement to enter the refueling preparation mode to the control device 180 depending on manipulation of the user. The control device 180 may receive information transmitted from the user interface device 170 and may determine an intention of the user to enter the refueling preparation mode based on the received information. For example, when receiving the information indicating the agreement of the user to enter the refueling preparation mode from the user interface device 170, the control device 180 may determine to enter the refueling preparation mode. Meanwhile, when receiving the information indicating the disagreement of the user to enter the refueling preparation mode from the user interface device 170, the control device 180 may determine not to enter the refueling preparation mode.

When the intention of the user to agree to enter the refueling preparation mode is identified, in S320, the control device 180 may determine the target operating pressure of a storage vessel 162 of FIG. 1. When the intention of the user to agree to enter the refueling preparation mode is identified, the control device 180 may enter the refueling preparation mode. Furthermore, the control device 180 may downwardly adjust the steady state operating pressure by a predetermined pressure (e.g., 1 bar) and may determine the downwardly adjusted operating pressure as the target operating pressure of the storage vessel 162. The steady state operating pressure may be defined as the target operating pressure of the storage vessel 162 in a steady state where the limit to the power of a power train 110 of FIG. 1 is not required. The steady state operating pressure may vary with system configuration and may be determined by a system designer in advance. For example, when the user agrees to enter the refueling preparation mode, the control device 180 may determine a pressure of 3 bar to 6 bar obtained by subtracting a predetermined pressure of 1 bar from the steady state operating pressure of 4 bar to 7 bar as the target operating pressure. As such, the control device 180 may determine a pressure lower than the target operating pressure in the steady state as the target operating pressure in the refueling preparation mode.

The control device 180 may control power of the power train 110 to continue operation of the mobility 100 until the mobility 100 arrives at the hydrogen refueling station.

In S340, the control device 180 may compare a target hydrogen supply pressure with a hydrogen supply pressure and may identify whether the hydrogen supply pressure is greater than or equal to the target hydrogen supply pressure. The control device 180 may identify whether the supply pressure of the hydrogen supplied to the power train 110, that is, the hydrogen supply pressure, is greater than or equal to the target hydrogen supply pressure and may determine whether to limit the power of the power train 110 depending on the identified result. The target hydrogen supply pressure may be defined as a power limit target value (or the amount of the maximum hydrogen supply) of a fuel supply device 164 of FIG. 1 according to the target operating pressure. The target hydrogen supply pressure may vary with system configuration and may be determined by a system designer in advance.

When it is identified that the hydrogen supply pressure is greater than or equal to the target hydrogen supply pressure, in S350, the control device 180 may normally operate the power of the power train 110. At this time, the control device 180 may normally operate the power of the power train 110 without limiting the power of the power train 110.

When it is identified that the hydrogen supply pressure is less than the target hydrogen supply pressure, in S360, the control device 180 may limit the power of the power train 110. The control device 180 may determine a power limit target value of the power train 110 based on a mapping table in which the amount of the maximum hydrogen supply of the fuel supply device 164 according to the operating pressure of the storage vessel 162 is defined. The control device 180 may display information indicating that the power of the power train 110 is limited on a display of the user interface device 170 such that the user recognizes that the power of the power train 110 is limited. At this time, the control device 180 may control the user interface device 170 to output the maximum power information together in a power limit state.

When the mobility 100 arrives at a hydrogen refueling station, in S370, the control device 180 may end the start-up of the power train 110 and may restart the power train 110. When the mobility 100 arrives at the hydrogen refueling station and receives a start-up end command from an upper-level control device, the control device 180 may immediately end the start-up of the power train 110. Furthermore, the control device 180 may charge an auxiliary power train 120 of FIG. 1 to the maximum and may additionally reduce the internal pressure of the storage vessel 162 without immediately stopping the power train 110 when the mobility 100 arrives at the hydrogen refueling station and receives the start-up end command from the upper-level control device. At this time, the control device 180 may output information indicating that "the internal pressure of the storage vessel is being reduced to increase the SOC" using the user interface device 170. Thereafter, when receiving a start-up command from the upper-level control device, the control device 180 may restart the power train 110.

When restarting the power train 110, in S380, the control device 180 may identify whether the remaining amount of fuel of the storage vessel 162 is greater than or equal to a predetermined reference amount of fuel (e.g., 80%). The reference amount of fuel may be used as a criterion for determining whether refueling of the storage vessel 162 is completed. The control device 180 may identify the actual amount of fuel using a liquid level sensor of the storage vessel 162 to identify whether refueling is completed. When it is identified that the remaining amount of fuel of the storage vessel 162 is greater than or equal to the predetermined reference amount of fuel (e.g., 80%), the control device 180 may exit the refueling preparation mode. When exiting the refueling preparation mode, the control device 180 may output a message, e.g., "Exit the refueling preparation mode" on a cluster. Furthermore, the control device 180 may output another type of information, for example, a sound effect, a voice, or the like, which is indicative of exiting the refueling preparation mode.

When it is identified that the remaining amount of fuel of the storage vessel 162 is less than the predetermined reference amount of fuel in S380, in S390, the control device 180 may output a message asking a user whether to exit the refueling preparation mode on the user interface device 170. For example, the control device 180 may output an inquiry message, "Do you want to exit the refueling preparation mode?" on the cluster. Thereafter, the control device 180 may exit the refueling preparation mode when the driver selects "YES" and may maintain the refueling preparation mode when the driver selects "NO."

In S400, the control device 180 may identify an intention of the user to exit the refueling preparation mode. When the user agrees to exit the refueling preparation mode, the control device 180 may exit the refueling preparation mode. Meanwhile, when the user does not agree to exit the refueling preparation mode, the control device 180 may perform the operation from S320.

Figure 4:
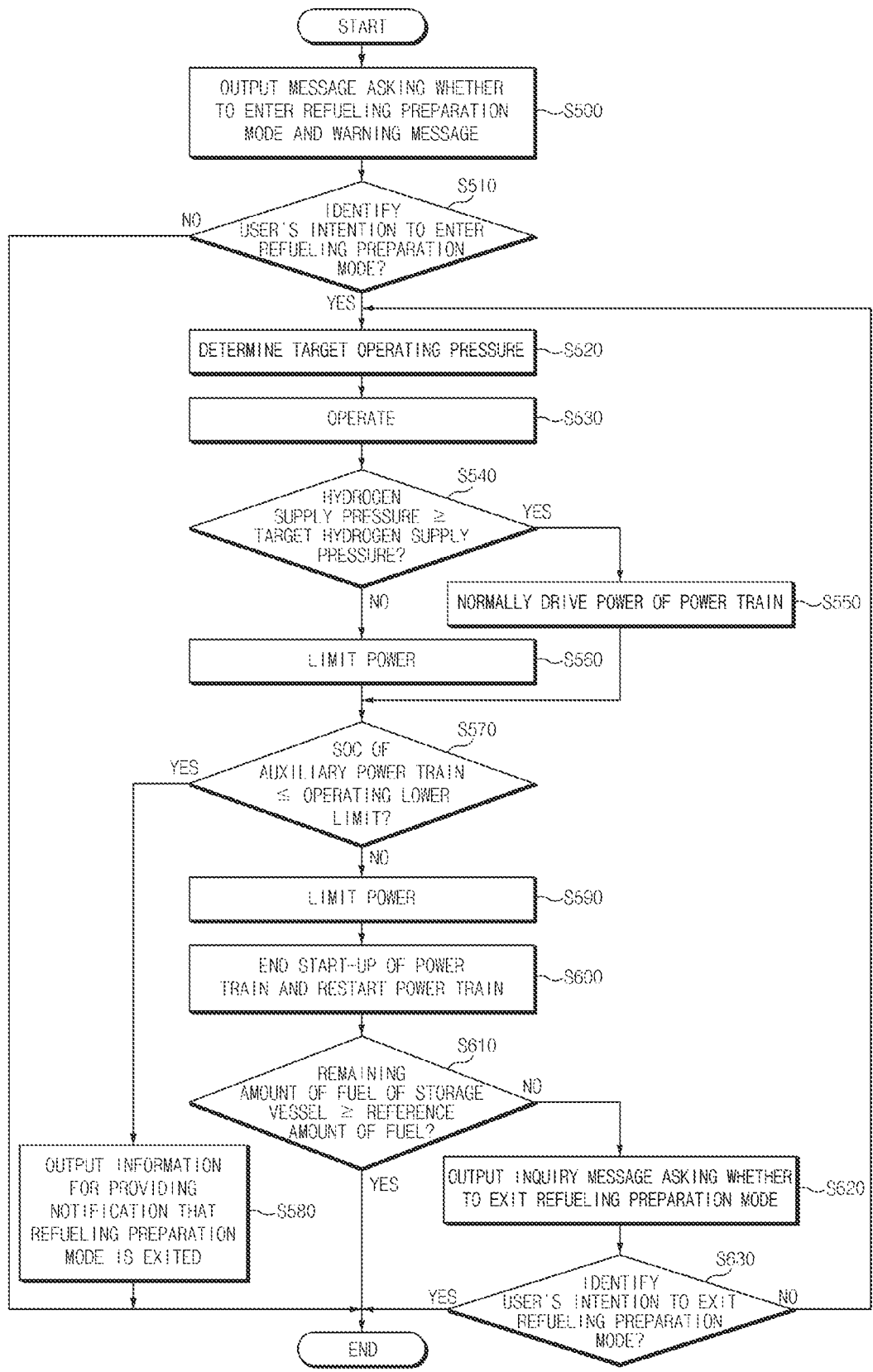
FIG. 4 is a flowchart illustrating a method for controlling operation of a mobility according to another embodiment of the present disclosure.

FIG. 4 is a flowchart illustrating a method for controlling operation of a mobility according to another embodiment of the present disclosure.

When a mobility 100 of FIG. 1 meets a refueling ready execution condition, in S500, a control device 180 of FIG. 1 may output a message asking whether to enter a refueling preparation mode and a warning message. When a destination of the mobility 100 is set to a hydrogen refueling station or when a switch to which a function of enabling and disabling the refueling preparation mode is allocated is turned on, the control device 180 may determine that the mobility 100 meets the refueling ready execution condition. When it is determined that the mobility 100 meets the refueling ready execution condition, the control device 180 may output an inquiry message for identifying an intention of a user (or a driver), e.g., "Do you want to enter the refueling preparation mode?" and a warning message warning of a possibility that a limit to power of the power train 110 will occur, e.g., "A limit to power may occur while operating in the refueling preparation mode." on a user interface device 170 of FIG. 1. At this time, the user interface device 170 may output the messages on a display in the form of visual information. Furthermore, the user interface device 170 may output the messages through a speaker in the form of audible information.

In S510, the control device 180 may identify an intention of the user to enter the refueling preparation mode. The control device 180 may identify whether the user has an intention to enter the refueling preparation mode using the user interface device 170. The user interface device 170 may transmit information indicating agreement to enter the refueling preparation mode or disagreement to enter the refueling preparation mode to the control device 180 depending on a manipulation of the user. The control device 180 may receive information transmitted from the user interface device 170 and may determine an intention of the user to enter the refueling preparation mode based on the received information. For example, when receiving the information indicating the agreement of the user to enter the refueling preparation mode from the user interface device 170, the control device 180 may determine to enter the refueling preparation mode. Meanwhile, when receiving the information indicating the disagreement of the user to enter the refueling preparation mode from the user interface device 170, the control device 180 may determine not to enter the refueling preparation mode.

When the intention of the user to agree to enter the refueling preparation mode is identified, in S520, the control device 180 may determine a target operating pressure of a storage vessel 162 of FIG. 1. When the intention of the user to agree to enter the refueling preparation mode is identified, the control device 180 may enter the refueling preparation mode. Furthermore, the control device 180 may downwardly adjust a steady state operating pressure by a predetermined pressure (e.g., 1 bar) and may determine the downwardly adjusted operating pressure as the target operating pressure of the storage vessel 162. The steady state operating pressure may be defined as the target operating pressure of the storage vessel 162 in a steady state where the limit to power of a power train 110 of FIG. 1 is not required. The steady state operating pressure may vary with system configuration and may be determined by a system designer in advance. For example, when the user agrees to enter the refueling preparation mode, the control device 180 may determine a pressure of 3 bar to 6 bar obtained by subtracting a predetermined pressure of 1 bar from the steady state operating pressure of 4 bar to 7 bar as the target operating pressure. As such, the control device 180 may determine a pressure lower than the target operating pressure in the steady state as the target operating pressure in the refueling preparation mode.

In S530, the control device 180 may control power of the power train 110 to continue operation of the mobility 100 until the mobility 100 arrives at the hydrogen refueling station.

In S540, the control device 180 may compare a target hydrogen supply pressure with a hydrogen supply pressure and may identify whether the hydrogen supply pressure is greater than or equal to the target hydrogen supply pressure. The control device 180 may identify whether a supply pressure of the hydrogen supplied to the power train 110, that is, the hydrogen supply pressure, is greater than or equal to the target hydrogen supply pressure and may determine whether to limit power of the power train 110 depending on the identified result. The target hydrogen supply pressure may be defined as a power limit target value (or the amount of maximum hydrogen supply) of a fuel supply device 164 of FIG. 1 according to the target operating pressure. The target hydrogen supply pressure may vary with system configuration and may be determined by a system designer in advance.

When it is identified that the hydrogen supply pressure is greater than or equal to the target hydrogen supply pressure, in S550, the control device 180 may normally operate the power of the power train 110. At this time, the control device 180 may normally operate the power of the power train 110 without limiting the power of the power train 110.

When it is identified that the hydrogen supply pressure is less than the target hydrogen supply pressure, in S560, the control device 180 may limit the power of the power train 110. The control device 180 may determine a power limit target value of the power train 110 based on a mapping table in which the amount of a maximum hydrogen supply of the fuel supply device 164 according to an operating pressure of the storage vessel 162 is defined. The control device 180 may display information indicating that the power of the power train 110 is limited on a display of the user interface device 170 such that the user recognizes that the power of the power train 110 is limited. At this time, the control device 180 may control the user interface device 170 to output the maximum power information together in a power limit state.

In S570, the control device 180 may identify whether the SOC of an auxiliary power train 120 of FIG. 1 is less than or equal to a predetermined operating lower limit. The control device 180 may determine whether auxiliary power by the auxiliary power train 120 is insufficient based on the SOC of the auxiliary power train 120.

When the SOC of the auxiliary power train 120 is less than or equal to the predetermined operating lower limit in S570, in S580, the control device 180 may output information for providing a notification that the refueling preparation mode is exited. When the SOC of the auxiliary power train 120 reaches the predetermined operating lower limit, the control device 180 may determine that the auxiliary power by the auxiliary power train 120 is insufficient and may provide the notification that the refueling preparation mode is exited to exit the refueling preparation mode.

When the SOC of the auxiliary power train 120 is not less than or equal to the predetermined operating lower limit in S570, in S590, the control device 180 may maintain the limit to the power of the power train 110. When the SOC of the auxiliary power train 120 is greater than the predetermined operating lower limit, the control device 180 may determine that the auxiliary power by the auxiliary power train 120 is not insufficient and may limit the power of the power train 110.

When the mobility 100 arrives at a hydrogen refueling station, in S600, the control device 180 may end the start-up of the power train 110 and may restart the power train 110. When the mobility 100 arrives at the hydrogen refueling station and receives a start-up end command from an upper-level control device, the control device 180 may immediately end the start-up of the power train 110. Furthermore, the control device 180 may charge the auxiliary power train 120 to the maximum and may additionally reduce an internal pressure of the storage vessel 162, without immediately stopping the power train 110 when the mobility 100 arrives at the hydrogen refueling station and receives the start-up end command from the upper-level control device. At this time, the control device 180 may output information indicating that, e.g., "the internal pressure of the storage vessel is being reduced to increase the SOC" using the user interface device 170. Thereafter, when receiving a start-up command from the upper-level control device, the control device 180 may restart the power train 110.

When restarting the power train 110, in S610, the control device 180 may identify whether the remaining amount of fuel of the storage vessel 162 is greater than or equal to a predetermined reference amount of fuel (e.g., 80%). The reference amount of fuel may be used as a criterion for determining whether refueling of the storage vessel 162 is completed. The control device 180 may identify the actual amount of fuel using a liquid level sensor of the storage vessel 162 to identify whether refueling is completed. When it is identified that the remaining amount of fuel of the storage vessel 162 is greater than or equal to the predetermined reference amount of fuel (e.g., 80%), the control device 180 may exit the refueling preparation mode. When exiting the refueling preparation mode, the control device 180 may output a message, e.g., "Exit the refueling preparation mode" on a cluster. Furthermore, the control device 180 may output another type of information, for example, a sound effect, a voice, or the like, which is indicative of exiting the refueling preparation mode.

When it is identified that the remaining amount of fuel of the storage vessel 162 is less than the predetermined reference amount of fuel in S610, in S620, the control device 180 may output a message asking a user whether to exit the refueling preparation mode on the user interface device 170. For example, the control device 180 may output an inquiry message, "Do you want to exit the refueling preparation mode?" on the cluster. Thereafter, the control device 180 may exit the refueling preparation mode when the driver selects "YES" and may maintain the refueling preparation mode when the driver selects "NO."

In S630, the control device 180 may identify an intention of the user to exit the refueling preparation mode. When the user agrees to exit the refueling preparation mode, the control device 180 may exit the refueling preparation mode. Meanwhile, when the user does not agree to exit the refueling preparation mode, the control device 180 may perform the operation from S520.

Embodiments of the present disclosure may limit the power of a power train before refueling liquid hydrogen which is fuel and may reduce an internal pressure of a storage vessel to the maximum to increase refueling efficiency in one-time refueling, that is, the amount of one-time refueling, thus improving a driving range of the mobility.

Embodiments of the present disclosure may notify the user that there is a possibility that deterioration in operation performance will occur due to a limit to the power of a power train when limiting the power of the power train, such that the user may recognize the situation where the power is limited, thus allowing the user to operate the mobility depending on a power limit characteristic.

Furthermore, embodiments of the present disclosure may identify an intention of the user before entering and exiting a refueling preparation mode for limiting the power of the power train and may determine whether to limit the power of the power train, thus preventing dissatisfaction of the user due to the limit to the power.

Hereinabove, although embodiments of the present disclosure have been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present disclosure are not intended to limit the technical spirit of the present disclosure but are provided only for illustrative purposes. The scope of the present disclosure should be construed on the basis of the accompanying claims, and all the technical ideas within the scope equivalent to the claims should be included in the scope of the present disclosure.

What is claimed is:

1. A mobility comprising:
   a storage vessel;
   a power train configured to generate power using liquid hydrogen stored in the storage vessel; and
   a control device configured to:
   downwardly adjust a target operating pressure of the storage vessel at a time of entering a refueling preparation mode;
   compare a supply pressure of the liquid hydrogen supplied to the power train with a target hydrogen supply pressure according to the target operating pressure; and
   limit the power of the power train in response to the supply pressure of the liquid hydrogen being less than the target hydrogen supply pressure.

2. The mobility of claim 1, wherein the control device is configured to enter the refueling preparation mode in response to a destination of the mobility being set to a hydrogen refueling station or a switch to which a function of enabling and disabling the refueling preparation mode is allocated being turned on.

3. The mobility of claim 1, wherein the control device is configured to enter the refueling preparation mode in response to an intention of a user to agree to enter the refueling preparation mode being identified.

4. The mobility of claim 1, wherein the control device is configured to limit a maximum power of the power train based on a mapping table in which a power limit target value of the power train according to the supply pressure of the liquid hydrogen is defined.

5. The mobility of claim 1, wherein the control device is configured to exit the refueling preparation mode in response to a state of charge (SOC) of the storage vessel being greater than or equal to a predetermined reference value.

6. A mobility comprising:
   a storage vessel;
   a power train configured to generate power using liquid hydrogen stored in the storage vessel;
   an auxiliary power train configured to assist the power train to supply the power; and
   a control device configured to:
   downwardly adjust a target operating pressure of the storage vessel at a time of entering a refueling preparation mode;
   determine a target hydrogen supply pressure according to the target operating pressure; and
   limit the power of the power train in response to a supply pressure of the liquid hydrogen supplied to the power train being less than the target hydrogen supply pressure and a state of charge (SOC) of the auxiliary power train being higher than an operating lower limit.

7. The mobility of claim 6, wherein the control device is configured to enter the refueling preparation mode in response to a destination of the mobility being set to a hydrogen refueling station or a switch to which a function of enabling and disabling the refueling preparation mode is allocated being turned on.

8. The mobility of claim 6, wherein the control device is configured to enter the refueling preparation mode in response to an intention of a user to agree to enter the refueling preparation mode being identified.

9. The mobility of claim 6, wherein the control device is configured to limit a maximum power of the power train based on a mapping table in which a power limit target value of the power train according to the supply pressure of the liquid hydrogen is defined.

10. The mobility of claim 6, wherein the control device is configured to exit the refueling preparation mode in response to the SOC of the storage vessel being greater than or equal to a predetermined reference value.

11. The mobility of claim 10, wherein the control device is configured to exit the refueling preparation mode in response to an intention of a user to agree to exit the refueling preparation mode being identified.

12. The mobility of claim 6, wherein the control device is configured to output information indicating that the power of the power train is limited using a user interface device.

13. The mobility of claim 6, wherein the auxiliary power train comprises a battery or a supercapacitor.

14. A method for controlling an operation of a mobility, the method comprising:
downwardly adjusting a target operating pressure of a storage vessel in the mobility at a time of entering a refueling preparation mode;
comparing a supply pressure of hydrogen supplied to a power train in the mobility with a target hydrogen supply pressure according to the target operating pressure; and
limiting power of the power train in response to the supply pressure of the hydrogen being less than the target hydrogen supply pressure.

15. The method of claim 14, further comprising entering the refueling preparation mode in response to a destination of the mobility being set to a hydrogen refueling station or a switch to which a function of enabling and disabling the refueling preparation mode is allocated being turned on.

16. The method of claim 14, further comprising entering the refueling preparation mode in response to an intention of a user to agree to enter the refueling preparation mode being identified.

17. The method of claim 14, wherein limiting the power of the power train comprises limiting a maximum power of the power train based on a mapping table in which a power limit target value of the power train according to the supply pressure of the hydrogen is defined.

18. The method of claim 14, wherein limiting the power of the power train comprises:
identifying whether a state of charge (SOC) of an auxiliary power train in the mobility is less than or equal to an operating lower limit, wherein the auxiliary power train assists the power train to supply the power;
releasing the refueling preparation mode in response to the SOC of the auxiliary power train being less than or equal to the operating lower limit; and
limiting the power of the power train in response to the SOC of the auxiliary power train being greater than the operating lower limit.

19. The method of claim 14, further comprising exiting the refueling preparation mode in response to a state of charge (SOC) of the storage vessel being greater than or equal to a predetermined reference value.

20. The method of claim 14, further comprising exiting the refueling preparation mode in response to an intention of a user to agree to exit the refueling preparation mode being identified.

* * * * *